United States Patent [19]

Dahllöf

[11] Patent Number: 5,353,668
[45] Date of Patent: Oct. 11, 1994

[54] TOOLHOLDER FOR PEELING OPERATION

[75] Inventor: Yngve Dahllöf, Sandviken, Sweden

[73] Assignee: Sandvik AB, Sandviken, Sweden

[21] Appl. No.: 63,295

[22] Filed: May 19, 1993

[30] Foreign Application Priority Data

May 25, 1992 [SE] Sweden ................. 9201637

[51] Int. Cl.⁵ ................. B23B 27/06; B23D 13/00
[52] U.S. Cl. ................. 82/130; 407/108; 408/161; 409/310
[58] Field of Search ........... 29/33 F; 409/310, 299, 409/345; 82/130, 131; 407/108, 105; 408/161, 153

[56] References Cited

U.S. PATENT DOCUMENTS

| | | | |
|---|---|---|---|
| 3,049,058 | 8/1962 | Sadtler | 409/310 |
| 3,099,929 | 8/1963 | Lindemann | 82/130 |
| 3,603,186 | 9/1971 | Vigor et al. | 407/108 |
| 3,839,772 | 10/1974 | Shimomura et al. | 407/76 X |
| 4,229,127 | 10/1980 | Bartley | 408/158 X |
| 4,261,235 | 4/1981 | Scholz | 82/130 |
| 4,631,994 | 12/1986 | Jester et al. | 408/161 X |
| 4,799,300 | 1/1989 | Phillips | 29/33 F |
| 5,009,136 | 4/1991 | Glomb et al. | 82/130 X |
| 5,256,008 | 10/1993 | Hansson et al. | 82/130 |

FOREIGN PATENT DOCUMENTS

| | | |
|---|---|---|
| 0489701 | 6/1992 | European Pat. Off. |
| 1104289 | 4/1961 | Fed. Rep. of Germany ........ 82/130 |
| 2701441 | 1/1978 | Fed. Rep. of Germany . |
| 921602 | 3/1963 | United Kingdom . |
| 1389687 | 4/1975 | United Kingdom . |

OTHER PUBLICATIONS

Four-page International Search Report.

*Primary Examiner*—William Briggs
*Attorney, Agent, or Firm*—Burns, Doane, Swecker & Mathis

[57] ABSTRACT

The present invention provides a tool for bar peeling comprising a rotatable cutter head with circumferentially spaced toolholders each of which is provided with a U-shaped recess along one of its side surfaces. A wedge shaped element is longitudinally displaceable in the U-shaped recess so that an insert carried by the toolholder in subjected to radial adjustment upon a longitudinal displacement of said wedge shaped element.

8 Claims, 2 Drawing Sheets

TOOLHOLDER FOR PEELING OPERATION

BACKGROUND OF THE SUMMARY OF THE PRESENT INVENTION

The present invention relates to a cutting toolholder for a bar peeling operation, including a rotary cutter head that carries a plurality of toolholders each equipped with one or several inserts of cemented carbide or similar wear resistant material.

Bar peeling is a method by which an elongated bar is fed through a rotary cutter head equipped with a plurality of cutting tool distinctly provided around the periphery of the cutter head for the purpose of removing from the bar a thin layer of, e.g., millscale, surface cracks, etc., that result from the hot rolling of such bars or tubes. In order to achieve the best results regarding tolerances and surface finish, two different types of inserts are usually combined in the same holder.

It is desirable to be able to make a fine adjustment of the exact radial position or such inserts (normally 4). Normally, the adjustment range is on the order of 0.01 mm. This adjustment may be accomplished by grinding the supporting bevel face of the insert after the insert has been put into its location in the holder. The disadvantage of this method is that grinding the insert also removes the surface layer that normally has been deposited on the surface of the insert, e.g., by CVD-technique, for the purpose of increasing the lifetime of the insert. Hence, before starting to use the insert, the increased performance ability of the insert achieved by the layer deposited on the surface is taken away by grinding. Further, it is almost impossible to make exactly the same amount or grinding on all of the inserts of such a rotary cutter head of a bar peeling machine. Any resulting inaccuracy additionally impairs the precision of the tools.

In view thereof, it is a purpose of this invention to provide a toolholder in which the inserts can be maintained in their positions whilst being adjustable with other means.

It is another purpose of this invention to provide a toolholder that is equipped with means that will enable radial adjustment in a relatively simple manner without having to provide separate fixtures for the inserts and holders during the adjustment. It is a further purpose of the present invention to provide such adjustment means that can accomplish accurate fine adjustments without removing the toolholder from its location in the bar peeling machine.

The present invention provides a mechanism for fine adjustment of the radial position of the cutting edge with a very good precision. It is important to be able to make such radial adjustment without affecting the preadjusted axial position of the same insert.

These and other objects of the invention are achieved by a cutting tool for bar peeling which comprises a rotatable cutter head equipped with a plurality of toolholders around its periphery, each of which is carrying at least one cutting insert of wear resistant material. Each of the cutting tools carried by the toolholder is radially adjustable by longitudinal displacement of a wedge element.

BRIEF DESCRIPTION OF THE DRAWINGS

The objects and advantages of the invention will become more apparent from the following detailed description of a preferred embodiment thereof in connection with the accompanying drawings wherein like members bear like reference numerals and wherein.

DETAILED DESCRIPTION OF THE PREFERRED EMBODIMENTS

Figure 1:
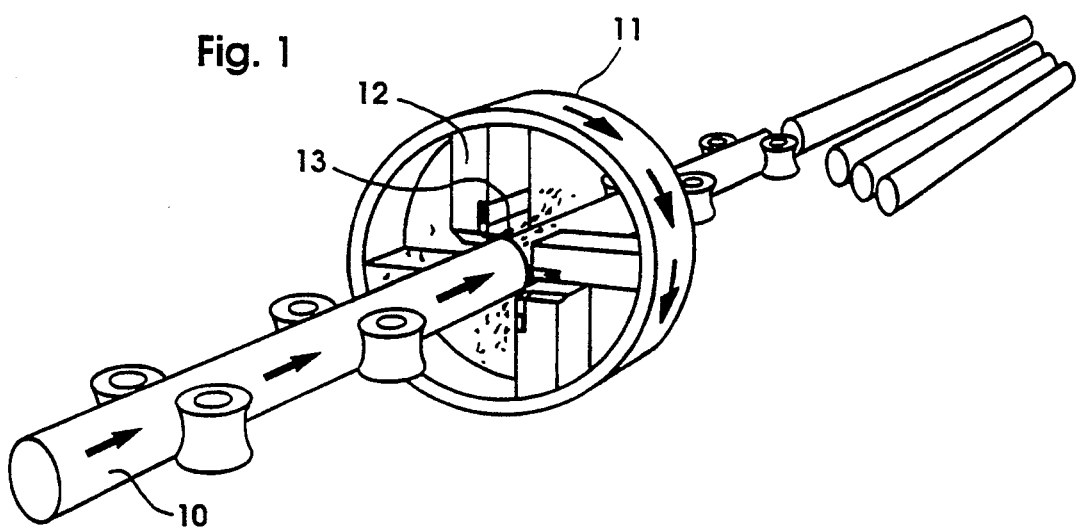
FIG. 1 is a perspective view of a conventional cutting tool for bar peeling.
Figure 2:
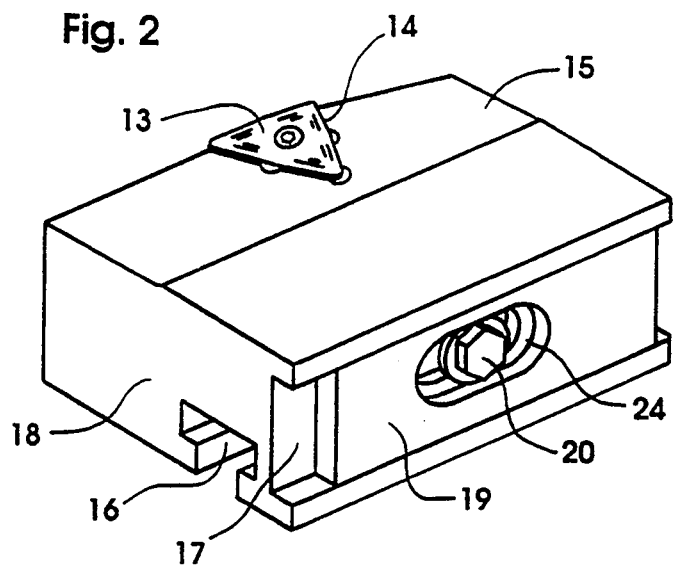
FIG. 2 is a perspective view of a toolholder for bar peeling provided with a cutting insert.

With reference to FIG. 1, a cylindrical bar 10 is shown that is intended to be the subject of a bar peeling operation by a rotary cutting head 11 equipped with a plurality of radially extending holder shafts 12. Each of the holder shafts 12 is carrying one or several cutting inserts 13 of cemented carbide or similar hard and wear resistant material. The head 11 is intended to rotate about an axis which coincides with the longitudinal axis of the cylindrical bar 10. As appears from FIG. 2, each insert 13 is located in a site or pocket 14 of a toolholder 15 that is arranged to be releasably attached to the holder shaft 12.

The rear wall of said toolholder 15 is along a portion of its length provided with a T-slot connection 16 intended to engage with a correspondingly designed clamping device provided in the rotary head 11. Further, the toolholder is along one of its edge surfaces provided with a U-shaped recess 17 that extends along the entire length of the toolholder 15. The recess 17 has a depth that continuously increases from one end surface 18 towards the opposite end. A wedge shaped element 19 is releasably arranged in said recess 17 by a screw 20 such that the wedge element becomes longitudinally displaceable in relation to the toolholder 15.

Figure 3:
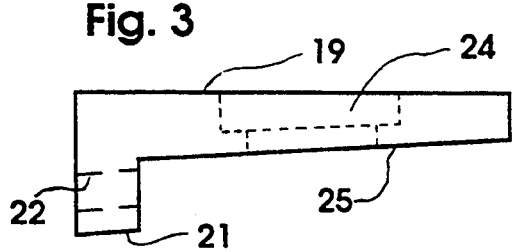
FIG. 3 is a side view of a wedge element aimed for use together with the toolholder in FIG. 2.
Figure 4:
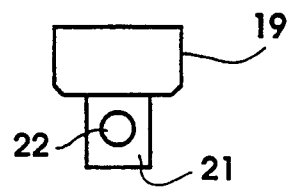
FIG. 4 is an end view of a wedge element as shown in FIG. 3.
Figure 5:
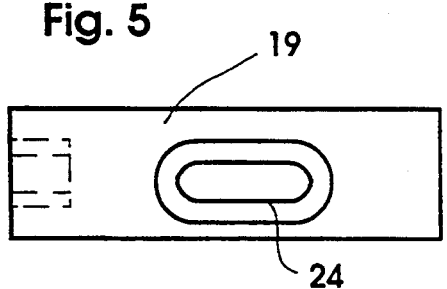
FIG. 5 is a plan view of the wedge element in FIG. 3.

With reference to FIGS. 3-5, the wedge element 19 is provided with a laterally extending protrusion 21 that extends substantially perpendicular to the longitudinal direction of the wedge. The protrusion 21 is located centrally at one end of the wedge and has a smaller width than the wedge (see FIG. 4). The protrusion 21 is provided with a central threaded hole 22 for threaded engagement with a screw 23 having right hand and left hand threaded portions 28, 27 respectively. The other end of the screw 23 is intended for threaded engagement with a corresponding threaded bore 29 in the holder 15. Further, the wedge element 19 is provided with an elongated slot 24 for the receipt of the screw 20, whereby the head of the screw 20 has a larger diameter than the width of the slot 24. Hence, an underneath surface 25 of the wedge 19 is intended to slidingly abut against the bottom surface of the recess 17. Adjustability of the wedge in the longitudinal direction is facilitated due to the fact that the protrusion 21 is exposed and accessible from one end of the toolholder as best appears in FIGS. 6 and 7.

Figure 6:
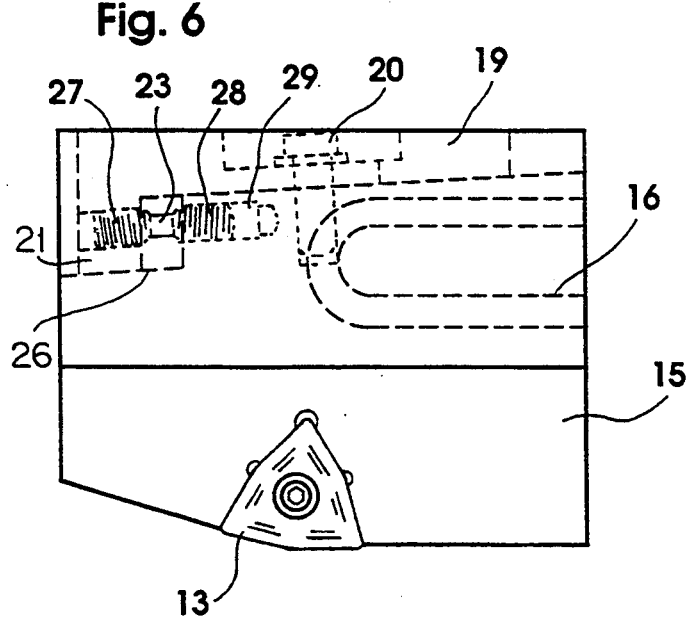
FIG. 6 is a plan view of a toolholder as shown in FIG. 2.
Figure 7:
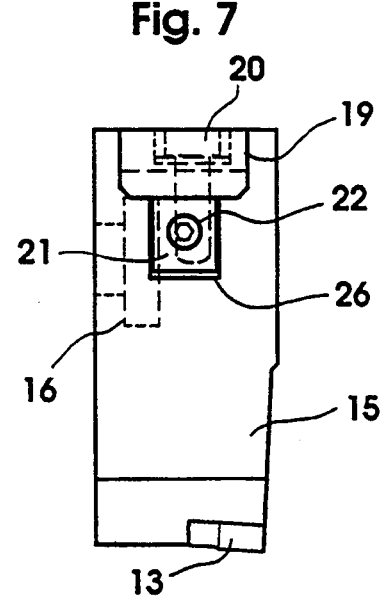
FIG. 7 is an end view of a toolholder as shown in FIG. 2.

As seen in FIGS. 6 and 7, the wedge element 19 is received in the toolholder 15 along its entire length. The protrusion 21 is received in a corresponding recess 26 in the toolholder 15 whereas the remainder of the wedge 10 is received in the recess 17. The left hand threaded portion 27 of the screw 23 is threadingly engaged with the protrusion 21 whereas the right hand threaded portion 28 of the screw is threadably engaged with a hole 29 in the toolholder 15 at the same inclination as the wedge surface 25. As a consequence, upon threading the screw 23 into the toolholder 15, movement of the wedge element 19 which has one surface in fixed abutment with an abutment surface in the holder shaft 12 causes the opposite surface 25 or the wedge to provide a movement radially inward of the toolholder 15 and the insert 13 provided thereon.

The principles, preferred embodiment and mode of operation of the present invention have been described in the foregoing specification. Variations and changes may be made by others without departing from the spirit of the present invention. Therefore, all such variations and changes that fall within the scope of the appended claims are intended to be embraced thereby.

I claim:

1. A tool for bar peeling comprising a rotatable cutter head having a plurality of holder shafts, each holder shaft carrying at the free end thereof a toolholder provided with at least one insert of wear resistant material, each said toolholder being secured to said holder shaft by releasable locking means, a wedge shaped element being releasably arranged and longitudinally displaceable with a wedge surface in sliding engagement with a corresponding surface of the toolholder and with an opposite surface slidably engaged with a support surface in the holder shaft, said wedge element having a protrusion at one end that extends substantially perpendicular to said wedge element, a right and left hand threaded screw being received in the protrusion and said toolholder in order to actuate the wedge element so that, the insert carried by the toolholder is subjected to radial adjustment upon a longitudinal displacement of said wedge shaped element.

2. A tool as defined in claim 1, wherein one edge surface of the toolholder is provided with a U-shaped recess, the depth of the recess increasing from one end surface towards the opposite end surface, said wedge element being received in said recess.

3. A tool as defined in claim 1, wherein the protrusion has a smaller width than the wedge element and is received in a corresponding recess in the toolholder.

4. A tool as defined in claim 2, wherein the U-shaped recess extends along the entire length of the toolholder.

5. A tool as defined in claim 1, wherein the threaded screw extends essentially parallel with an underneath surface of the wedge element, said screw being threadingly engaged in the toolholder in a position between the insert and the underneath surface of the wedge element.

6. A tool as defined in claim 1, wherein the screw is threadably received in a threaded bore in the toolholder and threadably received in a threaded bore in the protrusion that extends linearly with said threaded bore in the toolholder, said threaded bores extending in a direction parallel with an underneath side of the wedge element.

7. A tool as defined in claim 2, wherein the threaded screw extends essentially parallel with an underneath surface of the wedge element, said screw being threadingly engaged in the toolholder in a position between the insert and the underneath surface of the wedge element.

8. A tool as defined in claim 5, wherein the screw is threadably received in a threaded bore in the toolholder and threadably received in a threaded bore in the protrusion that extends linearly with said threaded bore in the toolholder, said threaded bores extending in a direction parallel with an underneath side of the wedge element.

* * * * *